(No Model.)
R. E. KING.
FRUIT JAR.
No. 359,449. Patented Mar. 15, 1887.
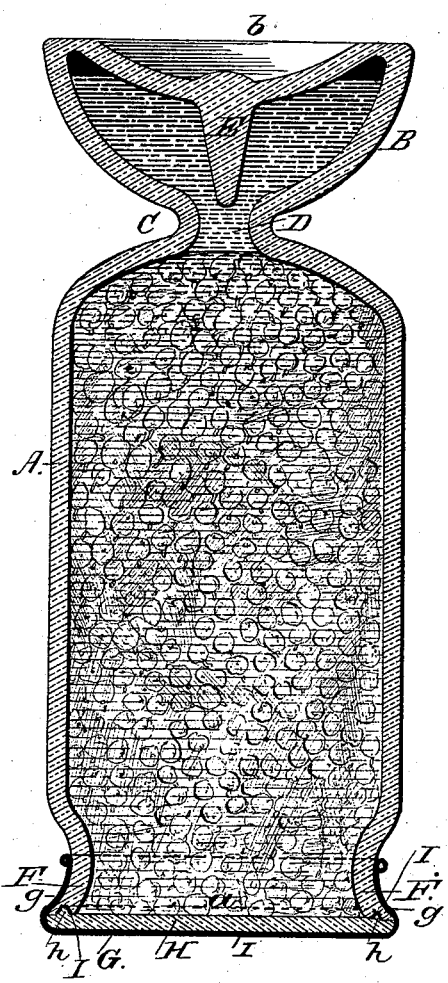
WITNESSES:
Fred G. Dieterich
P. B. Turpin
INVENTOR:
R. E. King
BY Munn & Co
ATTORNEYS.

UNITED STATES PATENT OFFICE.

ROBERT EDWARD KING, OF WARRENTON, NORTH CAROLINA.

FRUIT-JAR.

SPECIFICATION forming part of Letters Patent No. 359,449, dated March 15, 1887.

Application filed January 10, 1887. Serial No. 223,908. (No model.)

*To all whom it may concern:*

Be it known that I, ROBERT EDWARD KING, of Warrenton, in the county of Warren and State of North Carolina, have invented a new and useful Improvement in Fruit-Jars, of which the following is a specification.

My invention is an improved jar intended especially for canned or preserved fruit; and it consists, broadly, in a jar having a main or fruit chamber and a supplemental or sirup chamber, such chambers being connected by a contracted channel or opening, so the fruit will be prevented from passing into the sirup-chamber, while the sirup may pass into the fruit-chamber, all as will be described.

The invention further consists in certain novel constructions and combinations of parts, as will be more fully described and claimed hereinafter.

The figure of the drawing is a vertical longitudinal section of a jar constructed according to my invention.

The jar may be made of glass, crockery, or other suitable material.

In keeping preserves, pickles, and the like, it is desirable to retain the containing fluid or sirup over the fruit or articles, entirely submerging the same. By my invention I provide a jar having a chamber, into which the articles to be preserved may be packed, and also provide a supplemental sirup-chamber, which in operation is filled with sirup, so that as the fluid in the main chamber is absorbed by the articles therein the sirup will pass down from the supplemental chamber, such chambers being joined by a contracted opening, preventing the fruit from rising into the sirup-chamber, thus preventing the fruit from rising above the sirup or other liquid.

The jar is formed with a main or fruit chamber, A, and a supplemental or sirup chamber, B, which chambers are connected by a neck, C, which forms a contracted channel or opening, D, between such chambers A B. The end $b$ of chamber B is suitably formed to serve as a base on which to rest the jar in filling the same, to which end I preferably form the side walls of the chamber B, flaring or diverging from the neck C toward end $b$, as shown. A projection, E, extends toward the channel D and has its extremity terminating adjacent one end thereof. By preference this projection is fixed to end $b$ of the chamber B, and has its extremity terminating close to the end of channel D, opening into said chamber B. This projection operates as a further means of preventing the ingress of fruit into the sirup-chamber without materially limiting the passage of the sirup out of its chamber. At its end opposite its connection with chamber B the chamber A has a mouth, $a$, having flaring walls or flanges at F, and over such mouth I fit in operation the cap G, formed of rubber, and having an end or main plate, 1, and the cylindrical portion $g$, the free end of which embraces the sides of the mouth of the jar and serves to close the same.

When desired, for the reason of keeping the articles being preserved from contact with the rubber or for other reasons, the cap-plate H may be employed, such cap being formed with a rib or flange, $h$, to fit a rubber-lined groove, I, in the jar, and being in operation placed on the jar, as shown, after which the rubber cap is applied.

In use the jar is set on its end $b$ and filled with the fruit to be preserved, after which the sirup is poured in, filling the sirup-chamber and also the space in the main chamber not occupied by the articles therein. The cap is then applied and the jar inverted and rested on its capped end, as shown. Then as the sirup in the main chamber is absorbed the sirup in the supplemental chamber flows thereinto, as will be understood.

In case of freezing (if the rubber cap only is used) the rubber expands and prevents the breaking of the jar.

Having thus described my invention, what I claim as new is—

1. A jar having a main or fruit chamber and a supplemental or sirup chamber, and having such chambers joined by a contracted channel or opening, substantially as set forth.

2. A jar having main and supplemental chambers joined by a contracted channel or opening, and having a projection extended toward said channel, with its extremity terminating adjacent one end of the same, substantially as set forth.

3. A jar formed with a main or fruit and a supplemental or sirup chamber, and having a neck connecting and forming a contracted channel or opening between such parts, substantially as set forth.

4. A jar having a main and a supplemental chamber connected by a neck forming a contracted channel or opening, and having a projection extended from the end wall of the supplemental chamber, with its extremity terminating close to the connecting channel or opening, substantially as set forth.

ROBERT EDWARD KING.

Witnesses:
F. P. HUNTER,
WM. H. FARINHOLT.